US011407921B2

(12) United States Patent
Rector et al.

(10) Patent No.: US 11,407,921 B2
(45) Date of Patent: Aug. 9, 2022

(54) REACTION PRODUCTS OF CATECHOL COMPOUNDS AND FUNCTIONALIZED CO-REACTANT COMPOUNDS FOR METAL PRETREATMENT APPLICATIONS

(71) Applicant: Henkel AG & Co. KGaA, Duesseldorf (DE)

(72) Inventors: Louis Patrick Rector, Rochester Hills, MI (US); Donald Robb Vonk, Clinton Township, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 193 days.

(21) Appl. No.: 16/437,008

(22) Filed: Jun. 11, 2019

(65) Prior Publication Data

US 2019/0301023 A1    Oct. 3, 2019

Related U.S. Application Data

(63) Continuation of application No. PCT/US2017/068127, filed on Dec. 22, 2017.

(60) Provisional application No. 62/437,696, filed on Dec. 22, 2016.

(51) Int. Cl.
| | |
|---|---|
| C09D 179/02 | (2006.01) |
| B32B 15/04 | (2006.01) |
| B32B 15/08 | (2006.01) |
| C23C 22/05 | (2006.01) |
| C23C 22/06 | (2006.01) |
| C23C 22/50 | (2006.01) |
| C23C 22/56 | (2006.01) |
| C23C 22/60 | (2006.01) |
| C23C 22/73 | (2006.01) |
| C23C 22/76 | (2006.01) |
| C23C 22/82 | (2006.01) |
| C23F 11/04 | (2006.01) |

(52) U.S. Cl.
CPC ............ *C09D 179/02* (2013.01); *B32B 15/04* (2013.01); *B32B 15/08* (2013.01); *C23C 22/05* (2013.01); *C23C 22/06* (2013.01); *C23C 22/50* (2013.01); *C23C 22/56* (2013.01); *C23C 22/60* (2013.01); *C23C 22/73* (2013.01); *C23C 22/76* (2013.01); *C23C 22/82* (2013.01); *C23F 11/04* (2013.01)

(58) Field of Classification Search
CPC ....... C09D 179/02; B32B 15/04; B32B 15/08; C23C 22/05; C23C 22/06; C23C 22/50; C23C 22/56; C23C 22/60; C23C 22/73; C23C 22/76; C23C 22/82
See application file for complete search history.

(56) References Cited

U.S. PATENT DOCUMENTS

| | | | |
|---|---|---|---|
| 5,015,507 A | 5/1991 | DesLauriers et al. | |
| 5,266,410 A | 11/1993 | Lindert et al. | |
| 5,891,952 A | 4/1999 | McCormick et al. | |
| 6,027,578 A * | 2/2000 | Marzano ................. | C23C 22/40 |
| | | | 148/243 |
| 6,132,808 A | 10/2000 | Brown et al. | |
| 6,607,610 B1 | 8/2003 | Carey et al. | |
| 7,063,735 B2 | 6/2006 | Fristad et al. | |
| 7,390,847 B2 * | 6/2008 | Gonzalez ................. | C23C 22/34 |
| | | | 524/406 |
| 7,976,692 B2 | 7/2011 | Hu et al. | |
| 8,287,662 B2 * | 10/2012 | Inbe ......................... | C25D 3/02 |
| | | | 148/247 |
| 8,999,452 B2 | 4/2015 | Messersmith et al. | |
| 9,028,667 B2 | 5/2015 | Inbe et al. | |
| 9,394,621 B2 | 7/2016 | Inbe et al. | |
| 2004/0137246 A1 | 7/2004 | Fristad et al. | |
| 2005/0121114 A1 | 6/2005 | Fernandez et al. | |

(Continued)

FOREIGN PATENT DOCUMENTS

| | | |
|---|---|---|
| CN | 1052317 A | 6/1991 |
| CN | 101137767 A | 3/2008 |

(Continued)

OTHER PUBLICATIONS

Faure, Emily, et al "Catechols as Versatile Platforms in Polymer Chemistry", Progress in Polymer Science, 38.1 (2013); 236-270, Copyright 2012 Elsevier Ltd.

(Continued)

*Primary Examiner* — Anthony J Zimmer
*Assistant Examiner* — Ricardo D Morales
(74) *Attorney, Agent, or Firm* — Mary K. Cameron

(57) ABSTRACT

An aqueous, acidic, anti-corrosion conversion coating composition (in particular, an aqueous, acidic Group IV metal-containing anti-corrosion conversion coating composition) for metal substrates comprising as an additive a catechol compound and/or the reaction products of at least one catechol compound and at least one co-reactant compound having one or more functional groups reactive with the at least one catechol compound, desirably the reaction product of a catechol and an polyamine (e.g., a polyethyleneimine), that enhances the anti-corrosion effects of the conversion coating composition; methods of making and applying the conversion coating compositions and coated metal substrates. The catechol-containing conversion coating composition can be applied to metal substrate surfaces at temperatures as low as below 40° C. and with exposure times of 5 minutes or less. The catechol compound or reaction product thereof can become incorporated into the conversion coating formed on the metal substrate.

11 Claims, No Drawings

(56) References Cited

U.S. PATENT DOCUMENTS

| | | |
|---|---|---|
| 2005/0126427 A1 | 6/2005 | Gonzalez et al. |
| 2006/0172064 A1 | 8/2006 | Kolberg et al. |
| 2008/0171012 A1 | 7/2008 | Messersmith et al. |
| 2008/0302448 A1 | 12/2008 | Frey et al. |

FOREIGN PATENT DOCUMENTS

| | | |
|---|---|---|
| CN | 102634792 A | 8/2012 |
| CN | 102677032 A | 9/2012 |
| CN | 103435830 A | 12/2013 |
| CN | 103525154 A | 1/2014 |
| CN | 103739867 A | 4/2014 |
| CN | 103757619 A | 4/2014 |
| CN | 102787312 B | 5/2014 |
| CN | 103789759 A | 5/2014 |
| CN | 104141124 A | 11/2014 |
| CN | 104194026 A | 12/2014 |
| CN | 104211979 A | 12/2014 |
| CN | 104357816 A | 2/2015 |
| CN | 104562002 A | 4/2015 |
| CN | 103183989 B | 6/2015 |
| CN | 104746073 A | 7/2015 |
| CN | 104846354 A | 8/2015 |
| CN | 105088212 A | 11/2015 |
| CN | 105111495 A | 12/2015 |
| CN | 103160824 B | 1/2016 |
| DE | 3835400 A1 | 3/1990 |
| GB | 1129196 A | 10/1968 |
| JP | S5394583 A | 8/1978 |
| JP | 2012072440 A | 4/2012 |
| KR | 20120082156 A | 7/2012 |
| NL | 287499 A | 2/1965 |
| WO | 03008376 A2 | 1/2003 |
| WO | 2007117044 A1 | 10/2007 |
| WO | 2013185131 A1 | 12/2013 |

OTHER PUBLICATIONS

Roberts, Donald E., "Heats of Polymerization. A Summary of Published Values and Their Relation to Structure", Journal of Research of the National Bureau of Standards, Research Paper RP2703, vol. 44 (1950), 221-232. Year 1950.

Odian, George, "Principies of Polymerization", Fourth Edition, John Wiley & Sons, Inc. Copyright 2004.

LibreTexts 3.1: "Thermodynamics of Polymerization", Sep. 7, 2020, 2 pages. Retrieved Apr. 15, 2021, Year 2020.

Supplementary EP Search Report for EP 17885001 dated Jul. 10, 2020.

Supplementary EP Search Report for EP 17882552 dated Jul. 10, 2020.

Supplementary EP Search Report for EP 17885384 dated Jul. 10, 2020.

Saad Moulay: "Dopa/Catechol-Tethered Polymers: Bioadhesives and Biomimetic Adhesive Materials", Polymer Reviews, vol. 54, Issue 3, May 5, 2014, pp. 436-513, *p. 495, lines 7-20; figure 72*. Cited in Supplementary EP Search Report for EP 17882552 dated Jul. 10, 2020.

International Search Report for PCT/US2017/068127 dated Apr. 26, 2018.

International Search Report for PCT/US2017/068134 dated May 17, 2018.

International Search Report for PCT/US2017/068138 dated May 17, 2018.

Wu et al, "Low-cost mussel inspired poly(catechol/polyamine) coating with superior anti-corrosion capability on copper", Journal of Colloid and Interface Science, 463 (2016), pp. 214-221.

Ghelichkhah et al, "L-cysteine/polydopamine nanoparticle-coatings for copper corrosion protection", Corrosion Science, 91 (2015), pp. 129-139.

Zhao et al, "Mussel-Inspired One-Pot Synthesis of a Fluorescent and Water-Soluble Polydopamine-Polyethyleneimine Copolymer", Macromolecular Rapid Communications, 2015, 36, pp. 909-915, DOI: 10.1002/marc.201500021, Copyright Wiley-VCH Verlag GmbH & Co. KGaA, Weinheim.

Jiang, et al, "Surface Characteristics of a Self-Polymerized Dopamine Coating Deposited on Hydrophobic Polymer Films", American Chemical Society Copyright 2011, dx.doi.org/10.1021/la202877k, Langmuir 2011, 27, pp. 14180-14187.

Wang et al ("Mussel inspired modification of polypropylene separators by catechol/polyamine for Li-ion batteries." ACS Applied Materials & Interfaces 6.8 (2014): pp. 5602-5608), Year 2014—Cited in related co-pending U.S. Appl. No. 16/437,072.

Smith & Van Ness, Introduction to Chemical Engineering Thermodynamics, Fourth Edition, McGraw-Hill, Inc. p. 517 (1987)—Cited in related co-pending U.S. Appl. No. 16/437,072.

\* cited by examiner

REACTION PRODUCTS OF CATECHOL COMPOUNDS AND FUNCTIONALIZED CO-REACTANT COMPOUNDS FOR METAL PRETREATMENT APPLICATIONS

CROSS-REFERENCE TO RELATED APPLICATION

This application is a continuation of PCT/US2017/068127, filed Dec. 22, 2017, which claims priority to United States Provisional Application No. 62/437,696, filed Dec. 22, 2016, the disclosure of which is incorporated herein by reference in its entirety for all purposes.

TECHNICAL FIELD

This invention relates generally to metal pretreatment compositions and more particularly to a metal pretreatment composition for corrosion protection, methods of making and applying the metal pretreatment compositions and metal substrates having a conversion coating deposited thereon.

BACKGROUND OF THE INVENTION

Many consumer and industrial goods are formed from metal substrates and are exposed to the elements. As such, these metal goods are subject to corrosive environments thus they are often coated in protective coatings including corrosion protection coatings and paints. Many such corrosion protective coatings are known as conversion coatings, which are understood in the art to be a type of metal pretreatment formed by contacting a metallic surface with a metal pretreatment composition, i.e., a conversion coating composition, which modifies the metallic surface and forms a conversion coating thereon. While these conversion coatings offer protection, improvements in the corrosion resistance of metal conversion coatings is an ongoing market requirement for automotive and white goods applications. Past conversion coatings have included use of Periodic Table Group IV metals and oxides of the same, especially zirconium and titanium. These coatings have been effective; however, improvements continue to be sought.

There have been past attempts to utilize polycatecholamines in coating compositions such as in U.S. Pat. No. 8,999,452 by Messersmith et al. wherein a wide variety of bio-functional molecules were coated onto metals or plastics for diagnostic purposes. The process disclosed by Messersmith et al. for application of polycatecholamines (polymers of amine-functionalized catechol compounds) required alkaline conditions around pH 8.6 and long application times of greater than 8 hours to deposit very thin layers of polycatecholamine on metal or plastic substrates, e.g., 24 hours for 50 nanometers. While such processes might be adequate for laboratory work, they are not suitable for use in industrial production processes and for general coatings, e.g., automotive and white goods manufacturing. In addition, these coatings were not shown to provide any corrosion resistance to the substrates.

It is desirable to provide an improved metal pretreatment conversion coating composition that is simple to prepare and apply and which will improve upon the corrosion protection of existing conversion coatings.

SUMMARY OF THE INVENTION

In general terms, this invention provides a conversion coating composition containing a catechol compound and/or the reaction products of one or more catechol compounds and one or more co-reactant compounds comprised of one or more functional groups reactive with the catechol compound(s) (such as an amine, particularly a polyamine such as a polyethyleneimine) that are able to enhance the corrosion protection of aqueous acidic conversion coatings (particularly those containing Group IV metals) in a simple and efficient manner.

Methods of forming an additive that enhances corrosion protection of metal pretreatments, i.e., conversion coatings, deposited from an aqueous, acidic conversion coating composition (in particular, from an aqueous, acidic Group IV metal-containing conversion coating composition), generally comprise steps of:

a) providing an aqueous solution or dispersion of at least one catechol compound;

b) providing an aqueous solution or dispersion of at least one co-reactant compound comprised of one or more functional groups reactive with the at least one catechol compound (such as an amine, particularly a polyamine such as a polyethyleneimine);

c) combining the aqueous solution or dispersion of the catechol compound(s) with the aqueous solution or dispersion of the co-reactant compound(s) to form a reaction mixture; and d) reacting the reaction mixture under conditions selected such that oxygen is introduced into the reaction mixture, in the form of air or other oxygen-containing gas, for a time sufficient to react the catechol compound(s) with the co-reactant compound(s); and optionally e) purifying the reaction products.

Oxygen may be introduced into the reaction mixture by methods known to those of skill in the art, including by way of non-limiting example, bubbling air or oxygen into the reaction mixture, shaking or stirring the reaction mixture to introduce air bubbles and the like. Reaction conditions include maintaining a temperature in a range of about 10° C. to about 100° C. or even higher or about 10° C. to about 75° C., desirably in a range of 14° C. to 60° C. or 14° C. to 50° C., and preferably about 16° C. to 25° C. or about 20° C. to 50° C. for a period of time sufficient to form the desired quantity of reaction products of the catechol compound(s) and functionalized co-reactant compound(s) (e.g., amine, such as a polyamine like polyethyleneimine). Higher reaction temperatures (e.g., temperatures above 100° C.) may also be employed, particularly where the reaction is carried out under pressure or in a sealed vessel. Reaction time may range from 1 to 20 hours, desirably from about 3 to about 14 hours, and in one embodiment can be from 5 to 7 hours. The reaction time in other embodiments may be as little as 30 minutes, depending upon the reactivity of the catechol compound(s) and co-reactant compound(s), the reaction temperature and pressure, and oxidant (e.g., $O_2$) availability, among other factors, provided such conditions do not negatively affect the performance of the resulting reaction product(s) to an unacceptable extent. The reaction product(s) may be produced in a continuous synthesis process, using any of the procedures known in the polymer art; in such a process, a residence time of as little as 5 to 30 minutes may be employed.

In one embodiment, the present invention is a method of forming an additive that enhances corrosion protection of a conversion coating formed using an aqueous, acidic metal-containing conversion coating composition (in particular, an aqueous, acidic Group IV metal-containing conversion coating composition) comprising the steps of: a) providing an aqueous solution or dispersion of a catechol compound; b)

providing an aqueous solution or dispersion of an amine (e.g., a polyamine such as a polyethyleneimine); c) combining the aqueous solution or dispersion of the catechol compound with the aqueous solution or dispersion of the amine with vortex inducing vigorous stirring at a temperature of 16° C. to 25° C.; d) stirring the combined aqueous solution or dispersion with vigorous vortex inducing stirring at a temperature of 16° C. to 25° C. for a period of time from 5 to 7 hours to thereby form reaction products of the catechol compound and amine.

In one embodiment, the present invention is an additive that enhances the degree of corrosion protection of a conversion coating formed using an aqueous, acidic conversion coating composition (in particular, an aqueous, acidic Group IV metal-containing conversion coating composition) comprising: the reaction products of an aqueous reactant mixture of a catechol compound with an amine compound at a temperature of from 16 to 25° C. over a period of time from 5 to 7 hours with a molar ratio of catechol compound to amine functional groups of from 1:0.05 to 1:25 or 1:0.05 to 1:10.

In one embodiment, the present invention is an aqueous conversion coating composition having anti-corrosion effects comprising: at least one Group IV metal and at least one additive selected from the group consisting of catechol compounds, reaction products of at least one catechol compound and at least one co-reactant compound comprised of one or more functional groups reactive with the at least one catechol compound (where the co-reactant compound may be, for example, an amine, particularly a polyamine such as a polyethyleneimine, or a (meth)acryl-functionalized compound such as methacrylamidoethyl ethylene urea), and mixtures thereof, wherein the aqueous conversion coating composition has a pH of 5.0 or less.

In another embodiment, the present invention is a an aqueous conversion coating composition having anti-corrosion effects comprising: at least one Group IV metal; copper; free fluoride; nitrate; optionally at least one of zinc and an Si-based substance; and at least one additive selected from the group consisting of catechol compounds, reaction products of at least one catechol compound (such as a catecholamine; e.g., dopamine or a salt thereof) and at least one co-reactant compound comprised of one or more functional groups reactive with the at least one catechol compound (such as an amine, particularly a polyamine such as a polyethyleneimine, or a (meth)acryl-functionalized compound such as methacrylamidoethyl ethylene urea), and mixtures thereof; and the aqueous conversion coating has a pH of 5.0 or less.

In one embodiment the present invention is a method of coating a metal substrate with a conversion coating comprising the steps of: a) providing a metal substrate; b) providing an aqueous acidic conversion coating composition having a pH of 5.0 or less comprising: 50 to 750 ppm of at least one Group IV metal; 5 to 50 ppm of copper; 10 to 100 ppm of free fluoride; greater than 3500 ppm of nitrate; and 5 to 10,000 ppm of an additive, wherein the additive is selected from the group consisting of catechol compounds, reaction products of at least one catechol compound (e.g., a catecholamine such as dopamine or a salt thereof) and at least one co-reactant compound comprised of one or more functional groups reactive with the at least one catechol compound (such as an amine, particularly a polyamine such as a polyethyleneimine, or a (meth)acryl-functionalized compound such as methacrylamidoethyl ethylene urea), and mixtures thereof; and c) exposing the metal substrate to the conversion coating composition at a temperature of less than 40° C. and higher than the freezing point or precipitation point of the conversion coating composition, for a period of time sufficient to deposit a conversion coating on metallic surfaces of the metallic substrate contacted with the conversion coating composition. Generally, contact times range from about 30 seconds to times of 5 minutes or less.

For a variety of reasons, it is preferred that additives and conversion coatings containing catechol compound(s) and/or reaction products thereof according to the invention, and aqueous compositions for depositing these conversion coatings, as defined above, may be substantially free from many ingredients used in compositions for similar purposes in the prior art. Specifically, it is increasingly preferred in the order given, independently for each preferably minimized ingredient listed below, that aqueous conversion coating compositions according to the invention, when directly contacted with metal in a process according to this invention, contain no more than 1.0, 0.5, 0.35, 0.10, 0.08, 0.04, 0.02, 0.01, 0.001, or 0.0002 percent, more preferably said numerical values in grams per liter, more preferably in ppm, of each of the following constituents: chromium, nitrite ions, formaldehyde, formamide, hydroxylamines, ammonia; rare earth metals; sulfate; permanganate; perchlorate; boron, e.g. borax, borate; strontium; and/or free chloride. Also, it is increasingly preferred in the order given, independently for each preferably minimized ingredient listed below, that as-deposited coatings according to the invention, contain no more than 1.0, 0.5, 0.35, 0.10, 0.08, 0.04, 0.02, 0.01, 0.001, or 0.0002 percent, more preferably said numerical values in parts per thousand (ppt), of each of the following constituents: chromium, cyanide, nitrite ions, formaldehyde, formamide, hydroxylamines, ammonia; rare earth metals; sulfate; permanganate; chlorites and perchlorates; boron, e.g. borax, borate; strontium; and/or free chloride.

In various embodiments of the present invention, the conversion coating compositions may be characterized as comprising no more than 1000 ppm, no more than 500 ppm, no more than 400 ppm, no more than 300 ppm, no more than 200 ppm, no more than 100 ppm, no more than 50 ppm, no more than 25 ppm, no more than 10 ppm, no more than 5 ppm or no more than 1 ppm in total of any non-catechol polymer (defined herein as a polymer lacking any catechol moieties, particularly in the backbone of the polymer). For example, the conversion coating compositions in certain embodiments of the present invention contain not more than the aforementioned amounts of non-catechol polymers such as homo- and co-polymers of (meth)acrylates, polyurethane-based polymers or polyvinylidene chloride polymers.

The term "paint" as used herein includes all like materials that may be designated by more specialized terms such as lacquer, enamel, varnish, shellac, topcoat, and the like; and, unless otherwise explicitly stated or necessarily implied by the context. The simple term "metal" or "metallic" will be understood by those of skill in the art to mean a material, whether it be an article or a surface, that is made up of atoms of metal elements, e.g. aluminum, the metal elements present in amounts of at least, with increasing preference in the order given, 55, 65, 75, 85, or 95 atomic percent, for example the simple term "aluminum" includes pure aluminum and those of its alloys that contain at least, with increasing preference in the order given, 55, 65, 75, 85, or 95 atomic percent of aluminum atoms. A bare metallic surface will be understood to mean a metallic surface in the absence of a coating layer, other than oxides of metals derived from the metallic surface through aging in air and/or water.

Other than in the operating examples, or where otherwise indicated, all numbers expressing quantities of ingredients, reaction conditions, or defining ingredient parameters used herein are to be understood as modified in all instances by the term "about". Throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; molecular weight (MW) is weight average molecular weight unless otherwise specified; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well-defined molecules; and the terms "storage-stable" is to be understood as including solutions and dispersions that show no visually detectable, to the unaided human eye, tendency toward phase separation or precipitation over a period of observation of at least 100, or preferably at least 1000, hours, more preferably 3 months, most preferably 6 months, and particularly preferably 12 months during which the material is mechanically undisturbed and the temperature of the material is maintained at ambient room temperatures (18 to 40° C.).

Various aspects of the present invention may be summarized as follows:

Aspect 1: An additive that enhances corrosion protection of an aqueous, acidic conversion coating composition, wherein the additive comprises:

one or more reaction products of an aqueous liquid mixture of at least one catechol compound with at least one co-reactant compound comprised of one or more functional groups reactive with the at least one catechol compound reacted at a temperature of at least 0° C., desirably 10° C. to 100° C. or more, at a pressure of about 1 atmosphere or greater, over a period of time ranging from 30 minutes to 20 hours, said aqueous solution or dispersion having a molar ratio of catechol compound to functional groups reactive with the at least one catechol compound in the co-reactant compound of from 1:0.05 to 1:25.

Aspect 2: The additive as recited in Aspect 1 wherein said at least one catechol compound is selected from the group consisting of dopamine; catechol; 3,4-dihydroxy-L-phenylalanine; and salts and mixtures thereof.

Aspect 3: The additive as recited in Aspect 1 or 2 wherein said at least one co-reactant compound is selected from the group consisting of polyamines, methacrylamidoethyl ethylene urea, and mixtures thereof.

Aspect 4: A method of forming an additive that enhances corrosion protection of an aqueous, acidic conversion coating composition, wherein the method comprises the steps of:
a) forming an aqueous reaction mixture comprised of at least one catechol compound and at least one co-reactant compound comprised of one or more functional groups reactive with the at least one catechol compound; and
b) reacting the aqueous reaction mixture under conditions selected such that oxygen is introduced into the aqueous reaction mixture, for a time and at a temperature sufficient to react the at least one catechol compound with the at least one co-reactant compound to produce at least one reaction product; and optionally
c) purifying the at least one reaction product of the at least one catechol compound and the at least one co-reactant compound.

Aspect 5: The method as recited in Aspect 4 wherein the at least one catechol compound is selected from the group consisting of dopamine; catechol, 3,4-dihydroxy-L-phenylalanine; and salts and mixtures thereof.

Aspect 6: The method as recited in Aspect 4 or 5 wherein the at least one co-reactant compound is selected from the group consisting of polyamines, methacrylamidoethyl ethylene urea, and mixtures thereof.

Aspect 7: The method as recited in any of Aspects 4 to 6 wherein step b) comprises introducing oxygen into the aqueous reaction mixture by bubbling air into the aqueous reaction mixture.

Aspect 8: The method as recited in any of Aspects 4 to 7 wherein step b) comprises introducing oxygen into the aqueous reaction mixture by vortex inducing stirring.

Aspect 9: An aqueous conversion coating composition comprising: at least one Group IV metal, at least one additive selected from the group consisting of catechol compounds, reaction products of at least one catechol compound and at least one co-reactant compound comprised of one or more functional groups reactive with the at least one catechol compound, and mixtures thereof, and, optionally, one or more additional components selected from the group consisting of copper, free fluoride, zinc, nitrate and Si-based substances, said aqueous conversion coating having a pH of 5.0 or less.

Aspect 10: An aqueous conversion coating composition as recited in Aspect 9 wherein said at least one Group IV metal is present in an amount of from 5 to 750 ppm, if present, copper is present in an amount of from 5 to 50 ppm, if present, free fluoride is present in an amount of from 10 to 100 ppm, if present, nitrate is present in an amount of 3500 ppm or greater, and said additive is present in an amount of from 5 to 10,000 ppm.

Aspect 11: An aqueous conversion coating composition as recited in Aspect 9 or 10 wherein said at least one additive includes at least one of a catecholamine or salt thereof, at least one reaction product of a catecholamine or salt thereof and a polyamine at least one reaction product of a catecholamine and methacrylamidoethyl ethylene urea, and mixtures thereof.

Aspect 12: An aqueous conversion coating composition as recited in Aspect 11 wherein said catecholamine is selected from the group consisting of dopamine; 3,4 dihydroxy-L-phenylalanine; and salts and mixtures thereof.

Aspect 13: An aqueous conversion coating composition as recited in Aspect 11 or 12 wherein the at least one additive includes at least one reaction product of a catecholamine or salt thereof and a polyamine and/or at least one reaction product of a catecholamine and methacrylamidoethyl ethylene urea, wherein the molar ratio of the catecholamine or salt thereof to functional groups reactive with the catecholamine or salt thereof which are present in the polyamine and/or methacrylamidoethyl ethylene urea ranges from 1:0.05 to 1:25.

Aspect 14: An aqueous conversion coating composition as recited in any of Aspects 11 to 13, wherein the at least one additive includes at least one reaction product of a catecholamine or salt thereof and a polyamine and wherein said polyamine is linear or branched and has a number average molecular weight ranging from 500 to 50,000.

Aspect 15: A method of coating a metal substrate with a conversion coating composition comprising the steps of:

a) providing a metal substrate, optionally having a catechol-based rust preventative treatment thereon;

b) providing an aqueous acidic conversion coating composition having a pH of 5.0 or less comprising: at least one Group IV metal and at least one additive selected from the group consisting of a catechol compound, a reaction product of at least one catechol compound and at least one co-reactant compound comprised of one or more functional groups reactive with the at least one catechol compound, and mixtures thereof; and c) contacting the metal substrate with the conversion coating composition at a temperature of not more than 60° C. for a period of time of 20 minutes or less.

Aspect 16: The method as recited in Aspect 15 wherein said catechol compound is selected from the group consisting of dopamine; catechol; 3,4 dihydroxy-L-phenylalanine; and salts and mixtures thereof.

Aspect 17: The method as recited in Aspect 15 or 16 wherein said additive comprises the reaction products of a catechol compound and co-reactant compound selected from the group consisting of polyethyleneimines, methacrylamidoethyl ethylene urea, and mixtures thereof.

Aspect 18: The method as recited in any of Aspects 15 to 17 wherein said co-reactant compound is a linear or branched polyethyleneimine having a number average molecular weight of at least 100, preferably from 100 to 200,000, more preferably from 500 to 50,000 or more.

Aspect 19: The method as recited in any of Aspects 15 to 18, wherein the aqueous acidic conversion coating composition further comprises at least one of an Si-based substance, zinc, copper, free fluoride or nitrate.

Aspect 20: The method as recited in any of Aspects 15 to 19, wherein said Group IV metal comprises zirconium, titanium, or mixtures thereof.

These and other features and advantages of this invention will become more apparent to those skilled in the art from the detailed description of a preferred embodiment.

DETAILED DESCRIPTION OF CERTAIN EMBODIMENTS OF THE INVENTION

Many current conversion coating compositions utilized for corrosion protection include Periodic Table Group IV metal elements in the composition along with fluorides, copper and nitrates and possibly other components such as zinc and Si-based substances. These Group IV metals are Zr, Ti and Hf. Especially preferred in the present invention are Zr and Ti. One such coating composition is known as Bonderite® M-NT 1820, sold by Henkel. This conversion coating composition is based on Zr as the Group IV metal and provides corrosion protection to a wide variety of metal substrates including iron, steel, stainless steel, aluminum, galvanized metals including electrogalvanized and hot dipped galvanized metal. In the present invention, Bonderite® M-NT 1820 was utilized as a base comparative conversion coating composition and the present invention was compared to it.

In the present invention, it was surprisingly discovered that coatings containing small amounts of a catechol compound and/or the polymeric reaction products of catechol compounds with functionalized co-reactant compounds (such as an amine, in particular a polyamine such as a polyethyleneimine) had highly enhanced corrosion protective effects. In addition, combining a catechol compound (or catechol compounds) and/or the polymeric reaction products of catechol compounds with functionalized co-reactant compounds (e.g., compounds containing one or more (meth)acryl groups, secondary amino groups, primary amino groups, thiol groups and/or hydroxyl groups) with an acidic aqueous solution containing Periodic Table Group IV metals, such as Zr, Ti and/or Hf, allowed these catechol compounds and the reaction products of catechol compounds and co-reactant compounds to coat metal substrates at near ambient temperatures in less than 5 minutes. These results are completely unexpected given the prior art attempts showing that forming coatings on metals from catechol compounds required alkaline conditions, temperatures of greater than or equal to 40° C. and application times of greater than 5 hours. In the present invention, the catecholamine (e.g., dopamine or a dopamine salt) and catecholamine-containing polymers (e.g., reaction products of dopamine or a dopamine salt and polyethyleneimine) provided performance improvements in accelerated corrosion testing versus the surface treatment commercial benchmark, Bonderite® M-NT 1820.

In one embodiment, the inventive compositions comprised of Group IV metals and catechol compounds or reaction products of catechol compound and functionalized co-reactant compound (e.g., amine) are shown to deposit a mixture of metal oxides and catechol compound and/or reaction products of catechol compound and functionalized co-reactant compound under acidic conditions and with application times of about 2 minutes. Thus, one embodiment of the present invention provides an article comprising a metal substrate and a conversion coating on at least one surface of the metal substrate which is comprised of one or more Group IV metal oxides and at least one additive selected from the group consisting of catechol compounds and reaction products of at least one catechol compound and at least one co-reactant compound comprised of at least one functional group reactive with the at least one catechol compound.

The present invention comprises the use of a catechol compound and/or the reaction products of a catechol compound and a functionalized co-reactant compound (e.g., an amine, preferably a polyamine such as a polyethyleneimine, or a (meth)acryl-functionalized compound such as methacrylamidoethyl ethylene urea), as a component of a metal pretreatment composition.

Catechol Compounds

The term "catechol compound" as used herein means an organic compound with an aromatic ring system that includes at least two hydroxyl groups positioned on adjacent carbon atoms of the aromatic ring system. Suitable catechol compounds include compounds containing at least one 1,2-dihydroxybenzene moiety, i.e., an aromatic ring with hydroxyl groups ortho to each other, wherein the aromatic ring may be substituted (at positions other than where the hydroxyl groups are located) with one or more substituents other than hydrogen. Such other substituents may include, for example, one or more functional groups such as amino functional groups (in particular, primary and secondary amino groups), hydroxyl groups, carboxyl groups or thiol groups. A catechol compound such as dopamine which is functionalized with at least one amino group (which may be in the form of a salt, such as a hydrohalide salt) may sometimes be referred to herein as a "catecholamine". Combinations of two or more different catechol compounds may be used. The catechol compound(s) may be used directly as a component of a conversion coating composition or may be reacted with a functionalized co-reactant compound (such as a polyamine, e.g., a polyethyleneimine) to provide a reaction product also suitable for use as a component of a conversion coating composition in accordance with the present invention.

According to certain aspects of the invention, one or more catechol compounds in accordance with formula (I) may be utilized:

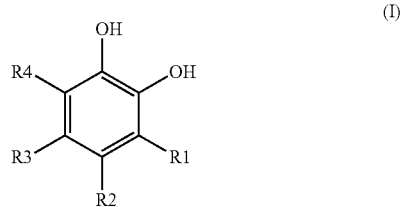

R1, R2, R3 and R4 may be the same as or different from each other and may be hydrogen or any suitable substituent that replaces hydrogen such as, for example, alkyl (e.g., C1-C12 alkyl such as methyl, ethyl, n-propyl, n-butyl and isomers thereof), alkenyl, halo, aminoalkyl, hydroxyalkyl, carboxy, alkoxy, aryl, aroxy, nitro, sulfo and the like and combinations thereof. In certain advantageous embodiments of the invention, the catechol compound contains at least one amine functional group, such as a primary or secondary amine group or a salt thereof (e.g., a hydrohalide salt).

According to certain embodiments, the catechol compound is soluble in water. For example, the catechol compound may have a solubility in water at 25° C. of at least 10 g/L, at least 50 g/L, at least 100 g/L or even higher. However, in other embodiments, the catechol compound is dispersible in water.

Illustrative, non-limiting examples of suitable catechol compounds include catechol, alkyl-substituted catechols (e.g., 3-methyl catechol, 4-methyl catechol, p-t-butyl catechol, 3-ethyl catechol, 3,5-di-t-butyl catechol, 3-isopropyl catechol, 4-isopropyl catechol, 4-propyl catechol, 3-propyl catechol, 4-pentyl catechol, 4-butyl catechol, 3,4-dimethyl catechol), aminoalkyl-substituted catechols and salts thereof (such as dopamine, 3,4-dihydroxy-L-phenylalanine, epinephrine, norepinedrine, α-methyldopamine, 4-(2-(ethylamino)-1-hydroxyethyl)catechol, N-isopropyl dopamine, 4-(2-aminopropyl)catechol, 3,4-dihydroxybenzylamine, N-methyl dopamine, N,N-dimethyl dopamine, 6-fluoro dopamine, dopexamine, 5-aminoethylpyrogallol, and salts thereof, including hydrohalide salts such as hydrochloride and hydrobromide salts), hydroxyalkyl-substituted catechols (e.g., 3,4-dihydroxybenzyl alcohol, 4-hydroxymethyl catechol), alkenyl-substituted catechols (e.g., 3,4-dihydroxystyrene), halo-substituted catechols (e.g., 4-chloro catechol, 4-fluoro catechol, 3-fluoro catechol, 4,5-dichloro catechol, tetrabromo catechol, tetrachloro catechol), alkoxy-substituted catechols (e.g., 3-methoxy catechol, 4-methoxy catechol), aroxy-substituted catechols (e.g., 3-phenoxy catechol), aryl-substituted catechols (e.g., 4-phenyl catechol, 3,3',4,4'-tetrahydroxybibenzyl), carboxy-substituted catechols (e.g., 3,4-dihydroxyacetophenone, 3,4-dihydroxybutyrophenone, 4-(chloroacetyl)catechol, ethyl 3,4-dihydroxybenzoate), nitro-substituted catechols (e.g., 4-nitro catechol, 3,4-dinitro catechol), sulfo-substituted catechols (e.g., 4-sulfo catechol and salts thereof), amino-substituted catechols (e.g., 4-amino catechol, 6-amino dopamine and salts thereof, especially hydrohalide salts) and the like. Combinations of two or more different catechol compounds may be used.

In the present invention a preferred catechol compound is dopamine, 4-(2-aminoethyl)benzene-1,2-diol, or a salt thereof (in particular, a hydrohalide salt, such as a hydrochloride or hydrobromide salt).

Co-Reactant Compounds

One or more co-reactant compounds may be reacted with one or more catechol compounds to form reaction products useful in the present invention. Suitable co-reactant compounds (sometimes referred to herein as "functionalized co-reactant compounds") are compounds comprised of one or more (preferably two or more) functional groups per molecule reactive with the catechol compound(s) used. In particular, the reactive functional groups may be selected from the group consisting of (meth)acryl groups, secondary amino groups, primary amino groups, thiol groups and hydroxyl groups. In a preferred embodiment, at least one co-reactant compound is utilized which is comprised of two or more primary and/or secondary amino groups per molecule. Where the co-reactant compound contains two or more functional groups per molecule, the functional groups may be the same as or different from each other. Without wishing to be bound by theory, secondary amino groups, primary amino groups, thiol groups and hydroxyl groups may be considered to be nucleophilic functional groups capable of forming covalent bonds at one or more sites within the catechol compound(s) through nucleophilic reactions such as, for example, Michael addition reactions and the like. As used herein, the term (meth)acryl group refers to functional groups characterized by an acryl structure (—C(=O)CH=CH$_2$) or methacryl structure (—C(=O)C(CH$_3$)=CH$_2$), such as acrylate (—OC(=O)CH=CH$_2$), methacrylate (—OC(=O)C(CH$_3$)=CH$_2$), acrylamide (—NHC(=O)CH=CH$_2$) or methacrylamide (—NHC(=O)C(CH$_3$)=CH$_2$). According to one embodiment of the invention, where a functionalized co-reactant compound comprising one or more (meth)acryl functional groups is employed, at least one catechol compound comprised of a primary amino, secondary amino, thiol or hydroxyl group is also used which is capable of reacting with the (meth)acryl functional group(s) (such as through a Michael-type addition reaction, for example).

The co-reactant compound may be monomeric, oligomeric or polymeric. Suitable co-reactant compounds include, for example, polyamines (e.g., polyethyleneimines), polythiols and polyalcohols, comprising a plurality of primary and/or secondary amino, thiol and/or hydroxyl groups per molecule. The functional groups may be substituted on aliphatic and/or aromatic carbon atoms.

In desirable embodiments of the invention, the co-reactant compound or combination of co-reactant compounds is soluble in water. For example, the co-reactant compound may have a solubility in water at 25° C. of at least 10 g/L, at least 50 g/L, at least 100 g/L or even higher. In other embodiments, however, the co-reactant compound may be dispersible in water or employed in the form of an aqueous dispersion (it being understood that a portion of the co-reactant compound may be in solution).

Advantageous embodiments of the invention include embodiments in which the at least one co-reactant compound includes at least one oligomeric or polymeric amine compound comprising a plurality of repeating units having structure —[$CH_2CH_2NH$]—. Such oligomeric and polymeric amine compounds may be linear or branched in structure. One or more polyethyleneimines, either linear or branched, may be used as the co-reactant compound(s), in accordance with desirable embodiments of the invention. The polyethyleneimine may have, for example, a number average molecular weight of 200 to 100,000, 500 to 50,000 or 800 to 25,000 (as measured by gel permeation chromatography), although higher molecular weight polyethyleneimines (e.g., having number average molecular weights up to 2,000,000) may also be utilized. In further embodiments, the polyethyleneimine may have a number average molecular weight of at least 100, preferably from 100 to 200,000, more preferably from 500 to 50,000 or more. Modified polyethyleneimines, such as ethoxylated polyethyleneimines, also are suitable for use. Polyethyleneimines may be prepared by ring-opening polymerization of aziridine, for example.

Other illustrative, non-limiting examples of suitable co-reactant compounds include amines corresponding to the structural formula $H_2N(CH_2CH_2NH)_nCH_2CH_2NH_2$, where n is 0 or an integer of from 1 to 10, polyether polyols, polyester polyols, amine-terminated polyether polyols, thiol-terminated polyether polyols, polyvinyl alcohols, polyallylamines, polythiol alkanes (optionally containing one or more ether oxygens), polyvinylamines and the like. The functionalized co-reactant compound(s) may be linear or branched in structure (including hyper-branched and dendritic structures).

Examples of suitable co-reactant compounds comprised of one or more (meth)acryl functional groups include methacrylamidoethyl ethylene urea.

With respect to the useful amines, both linear and branched amines can be used as well as polyamines. A preferred polyamine is polyethyleneimine (also known as polyethylenimine) which has the base structure (—$CH_2$—$CH_2$—NH—)$_n$. The reaction of the catechol compound and the amine may be carried out in an aqueous solution or dispersion. One advantage to use of the reaction product of a catechol compound with an amine in the process as opposed to just a catechol compound reacted solely with itself is that it removes the possibility of formation of the corresponding insoluble polycatechol reaction products precipitated in the coating solution as particulate matter (also referred to at times as "sludge"). Reaction products forming sludge are a costly waste of raw materials and generally require removal from the coating solution to avoid paint defects. The present inventors have found that metal substrates, pre-treated with a dilute aqueous acidic solution of a catechol compound such as dopamine or dopamine salt or the reaction products of dopamine or dopamine salt and an amine in the presence of Group IV metals, followed by the application of a commercial E-coat paint system, exhibit improved corrosion resistance versus a commercial pre-treatment control containing the Group IV metals (but no catechol compound or catechol compound/amine reaction product).

Catechol Compound/Co-Reactant Compound Reaction Products

As previously mentioned, conversion coating compositions in accordance with the present invention may be comprised of at least one reaction product of at least one catechol compound and at least one co-reactant compound comprised of one or more functional groups reactive with the at least one catechol compound ("catechol compound/co-reactant compound reaction product"). Generally, the catechol compound(s) and co-reactant compound(s) are selected and reacted to provide one or more organic reaction products in which multiple organic residues or moieties derived from these reactants are covalently bonded to each other. Typically, the reaction product(s) formed is/are polymeric. For example, the reaction product may be a cross-linked polymer. According to advantageous embodiments of the invention, the reaction products are soluble or dispersible in water. For example, the reaction products may have a solubility in water at 25° C. of at least 0.5%, at least 1%, at least 5% or at least 10% by weight.

Methods of Making Catechol Compound/Co-Reactant Compound Reaction Products

The reaction products of catechol compounds and functionalized co-reactant compounds used in the present invention may be prepared using any suitable technique. For example, the reaction may be carried out under oxidative conditions and/or conditions effective to achieve condensation of the catechol compound(s) and the functionalized co-reactant compound(s), thereby forming a polymeric reaction product. The precise reaction mechanisms are not well understood and the reaction products obtained are generally complex in structure. However, in at least some cases, it is believed that at least a portion of the reaction proceeds by way of Michael addition of a nucleophile (a Michael donor) in one of the reactants to an electrophilic site (a Michael acceptor) in the other reactant. For example, where the co-reactant compound contains an amino (primary or secondary), thiol or hydroxyl group, such nucleophilic functional group may add to the catechol compound via a Michael addition-type reaction. As another example, where the catechol compound contains a nucleophilic group such as a primary or secondary amino group, such nucleophilic group may add to a (meth)acryl group in the co-reactant compound (again, by way of a Michael addition-type mechanism). Such Michael addition-type reactions typically result in the formation of covalent heteroatom-carbon bonds (e.g., nitrogen-carbon covalent bonds). However, other types of reactions resulting in the formation of covalent bonds between the reactants may also take place. Internal reaction of one or more of the reactants may also occur; for example, when the catechol compound is an aminoethyl-substituted catechol such as dopamine, cyclization of the aminoethyl group to form an indole group may be observed. Carbon-carbon and/or nitrogen-nitrogen coupling reactions may also take place.

According to at least certain aspects, the catechol compound(s), the functionalized co-reactant compound(s) and the reaction product(s) are all soluble in water. However, in other embodiments, one or more of the catechol compound(s), the functionalized co-reactant compound(s) and/or the reaction product(s) are dispersible in water.

As discussed herein, the polymerization of dopamine onto a substrate has been shown to be a very slow process requiring greater than 8 hours under ambient conditions, making it impractical to deposit polydopamine on a metal substrate in high speed conversion coating applications. According to literature, the formation of polydopamine on a substrate requires an alkaline solution of dopamine, lengthy application times of greater than 8 hours, and in some cases elevated temperatures of 40° C. or greater. The inventors have discovered that acidic compositions of Group IV metals in combination with catechol compounds such as dopamine or a dopamine salt or the reaction products of catechol compounds and amines (or other functionalized co-reactant compounds) will deposit both Group IV metal oxides and catechol compounds or catechol compound-amine (or, more generally, catechol compound-functionalized co-reactant compound) reaction products onto metal substrates within brief application times of about 2 minutes. Additionally, reaction products of catechol compound and amine can be synthesized separately, mixed with Group IV metals in an acidic aqueous composition, and applied to metal substrates in a conversion coating stage using application times typical of conventional conversion coating technology, i.e., immersion times of less than 3 minutes, and produce suitable corrosion protective coatings. Metal substrates, pre-treated with a dilute aqueous solution of dopamine (or salt thereof) or the reaction products of dopamine (or salt thereof) and an amine in the presence of Group IV metals in an acidic solution, followed by the application of a commercial E-coat paint system, exhibit improved corrosion resistance versus a commercial pre-treatment control comprising the Group IV metals alone (i.e., not containing dopamine or the dopamine/amine reaction products).

Thus, in one embodiment of the invention, a preformed reaction product obtained by reaction of at least one catechol compound and at least one co-reactant compound comprised of one or more functional groups reactive with the at least one catechol compound is employed to formulate a conversion coating composition in accordance with the present invention. As used herein, the term "preformed" when referring to the reaction product means that the reaction product has been formed in advance of contacting a conversion coating composition with a metal substrate surface, e.g., at least 5, 30 or 60 minutes in advance of such contacting. Such preformed reaction products thus are to be contrasted with reaction products formed in situ by combining catechol compound and co-reactant compound in water in the presence of a metal substrate to be conversion coated whereby the reaction product essentially simultaneously forms and deposits on the surface of the metal substrate during conversion coating. Thus, the present invention may comprise reacting at least one catechol compound and at least one co-reactant compound comprised of one or more functional groups reactive with the at least one catechol compound to obtain at least one preformed reaction product, storing the at least one preformed reaction product for a period of time (e.g., at least 30 minutes, at least 1 hour, at least 12 hours, at least 1 day, at least 1 week, or at least 1 month), using the preformed reaction product after being stored for a period of time to prepare a conversion coating composition or a working bath comprising a conversion coating composition, and contacting the conversion coating composition or working bath with a surface of a metal substrate to provide a conversion-coated metal substrate.

The preparation of the reaction products of dopamine and an amine or other functionalized co-reactant compound eliminates the potential for polydopamine (PDA) homopolymerization in the deposition bath; PDA can polymerize in an aqueous phase and precipitate out of the deposition bath, contributing to sludge formation. The inventive reaction products of dopamine (or other catechol compound) plus an amine (or other functionalized co-reactant compound) used in an acidic solution of Group IV metals will deposit both Group IV metal oxides and dopamine-amine reaction products specifically on reactive metal substrates and reduce or eliminate the precipitation of PDA from the bulk working solution. Equally surprising in this approach is that reaction products based on very low levels of dopamine monomer, approximately 10% by weight of the dopamine and amine mixture, are found to be effective in the coating compositions.

Exemplary methods of forming reaction products suitable for use in accordance with the present invention may comprise the following steps:
 a) forming a reaction mixture comprised of an aqueous solution or dispersion of at least one catechol compound and at least one co-reactant comprised of one or more functional groups reactive with the at least one catechol compound (e.g., one or more functional groups selected from the group consisting of (meth)acryl groups, secondary amino groups, primary amino groups, thiol groups and hydroxyl groups); and
 b) reacting the reaction mixture under oxidative conditions (for example, conditions selected such that molecular oxygen is introduced into the reaction mixture, in the form of air or other molecular oxygen-containing gas; oxidants other than molecular oxygen may also be employed) for a time sufficient to react the at least one catechol compound with the at least one co-reactant compound to form at least one reaction product; and
 c) optionally, purifying the at least one reaction product.

Oxidative conditions may be provided by introducing molecular oxygen ($O_2$) and/or other oxidants (oxidizing agents) into the reaction mixture. Suitable illustrative oxidants include, in addition to molecular oxygen, ozone, peroxide compounds (e.g., hydrogen peroxide), persulfates and the like.

Oxygen may be introduced into the reaction mixture by methods known to those of skill in the art, including by way of non-limiting example, bubbling or sparging air or oxygen into the reaction mixture, shaking or stirring the reaction mixture to introduce air bubbles and the like. Reaction conditions include maintaining a temperature in a range of about 10° C. to about 100° C., desirably in a range of 14° C. to 60° C., and preferably about 20 to 50° C. for a period of time sufficient to form the desired quantity of reaction products of the catechol compound(s) and functionalized co-reactant compound(s). Higher reaction temperatures (e.g., temperatures above 100° C.) may also be employed, particularly where the reaction is carried out under pressure or in a sealed vessel. Reaction conditions generally are selected such that the reaction mixture remains liquid. Reaction time may range from 1 to 20 hours, desirably from about 3 to about 14 hours, and in one embodiment can be from 5 to 7 hours. The reaction time in other embodiments may be as little as 30 minutes, depending upon the reactivity of the catechol compound(s) and co-reactant compound(s), the reaction temperature and pressure, and oxidant (e.g., $O_2$) availability, among other factors, provided such conditions do not negatively affect the performance of the resulting reaction product(s) to an unacceptable extent. The reaction product(s) may be produced in a continuous synthesis process, using any of the procedures known in the polymer art; in such a process, a residence time of as little as 5 to 30 minutes may be employed.

In one embodiment, a reaction product suitable for using in the form of an aqueous solution to formulate conversion coating compositions in accordance with the present invention may be prepared by a method comprising the following steps: a) providing an aqueous solution or dispersion of at least one catechol compound (e.g., dopamine or a hydrohalide salt of dopamine) and at least one co-reactant compound comprised of one or more functional groups selected from the group consisting of (meth)acryl groups, secondary amino groups, primary amino groups, thiol groups and hydroxyl groups (e.g., a polyethyleneimine or methacrylamidoethyl ethylene urea); and b) stirring the aqueous solution or dispersion with vigorous vortex inducing stirring at a temperature of 20 to 50° C. for a period of time from 5 to 7 hours to thereby form reaction products of the catechol compound(s) and co-reactant compound(s).

The molar ratio of catechol compound(s) to reactive functional groups ((meth)acryl, amino, thiol, hydroxyl) in the co-reactant compound(s) is not believed to be particularly critical. However, in certain embodiments, a molar ratio of catechol compound(s) to reactive functional groups in the co-reactant compound(s) is from 1:0.05 to 1:10 or 1:0.05 to 1:25. In one embodiment, a molar excess of reactive functional groups relative to catechol compound is utilized. It will generally be desirable to select a molar ratio which is effective to provide reaction products which are water-soluble, e.g., reaction products which have a solubility in water at 25° C. of at least 0.1, at least 1, at least 5 or at least 10% by weight. The amount by weight of catechol compound need not be particularly high; that is, catechol compound/functionalized co-reactant compound reaction products that are effective in enhancing the corrosion resistance of a conversion-coated metal substrate surface may be prepared using relatively low weight amounts of catechol compound (e.g., 5 to 25, 5 to 20, or 5 to 15% by weight in total of catechol compound(s) based on the total weight of catechol compound and functionalized co-reactant compound).

The reaction products obtained may be subjected to one or more purification steps prior to being used in a conversion coating composition in accordance with the present invention. Such methods include, by way of illustration, filtration, dialysis, membrane treatment, ion exchange, chromatography and the like and combinations thereof. For example, halide salts may be formed as by-products, depending upon the reactants used to prepare the reaction product. If the presence of such halide salts (chloride salts, in particular) is determined to be detrimental to the performance of the conversion coating composition, they may be removed or reduced by any suitable method, such as treatment with an ion exchange resin capable of exchanging a less harmful anion for the halide. If unreacted catechol compound and/or unreacted co-reactant compound is present, together with reaction product, such unreacted materials may, if so desired, be removed before using the reaction product in a conversion coating composition. In certain embodiments of the invention, however, the conversion coating composition additionally is comprised of unreacted catechol compound(s), unreacted co-reactant compound(s), or both unreacted catechol compound(s) and unreacted co-reactant compound(s) in addition to reaction product.

An advantage of the present invention is that aqueous solutions or dispersions of catechol compound/functionalized co-reactant compound reaction products may be prepared in advance and conveniently stored in stable solution or dispersion form (including in the form of a concentrate) until such time as it is desired to utilize the catechol compound/functionalized co-reactant compound reaction products in the formulation of a conversion coating composition. Furthermore, such reaction products are typically storage-stable when formulated into a conversion coating composition.

Conversion Coating Compositions and Use Thereof

In one embodiment, the inventive conversion coating compositions are aqueous acidic solutions of one or more Group IV metals and one or more catechol compounds, preferably dopamine or a salt thereof such as a hydrohalide salt. In another embodiment, the inventive conversion coating compositions are aqueous acidic solutions of one or more Group IV metals and one or more reaction products obtained by reacting one or more catechol compounds, preferably dopamine or a salt thereof such as a hydrohalide salt, with one or more functionalized co-reactant compounds such as a polyamine (e.g., a polyethyleneimine) or methacrylamidoethyl ethylene urea. In still other embodiments, the inventive conversion coating compositions are aqueous acidic solutions of one or more Group IV metals, one or more catechol compounds, and one or more reaction products obtained by reacting one or more catechol compounds with one or more functionalized co-reactant compounds.

In one embodiment, the conversion coating compositions may be applied to reactive metal substrates by contacting the metal substrate with the aqueous conversion coating composition for approximately 2 minutes at a temperature of 24-40° C. Contacting may be accomplished by any suitable means including but not limited to dipping, spraying, roll-coating and the like. Contact times and temperatures may be varied, but are typically less than 20 minutes, preferably less than 10 minutes, more preferably less than 5 minutes. Desirably, contact time is at least about 1, 3, 5, 10, 15, 20, 30, 40, 50 or 60 seconds and is no more than about 9, 8, 7, 6, 5, 4, 3 or 2 minutes. Suitable contact times may include, for example, 5 seconds to 20 minutes, 30 seconds to 5 minutes, and 1 minute to 15 minutes. Desirably, the temperature ranges from at least about 21, 22, 23, 24, 25, 26, 27, 28, 29, 30, 31 or 32° C. and no more than about 40, 39, 38, 37, 36, 35, 34 or 33° C., Higher or lower temperatures, for example at least greater than the freezing point of the bath and up to 50° C., may be employed provided that they do not interfere with deposition of the conversion coating or negatively affect the metal pretreatment working bath or performance of the conversion coating. Suitable temperatures during contacting of the conversion coating composition with a metal substrate surface may include, for example, 10-60° C., 15-40° C. and 20-35° C.

The contact of the metal substrate with the aqueous acidic solutions of Group IV metals and catechol compound (and/or catechol compound/functionalized co-reactant compound reaction product) results in several reactions: oxidation of the metal substrate M ($M^0 \rightarrow M^{n+} + ne^-$), wherein M=Fe, Zn, Al; $H_2MF_6 + 2H_2O \rightarrow MO_2 + 6HF$, wherein M=Ti, Zr, or Hf. In the reactions, the catechol functionalities may bind to the substrate, substrate ions, or Group IV metal ions in solution or throughout the coating layer. Alternatively, instead of dip coating, the coating compositions can be applied by spraying or roll-coating. In another embodiment, the inventive compositions are the reaction products of a catechol compound (with dopamine or a salt thereof being a preferred one) and an amine in combination with aqueous acidic solutions of Group IV metals. The amine can be linear or branched and it can also be a polyamine, for example a polyethyleneimine. The organic synthesis reactions are generally conducted in aqueous solution. This organic concentrate is then used as one component of a conversion coating deposition bath. It has been demonstrated that a conversion coating of mixed Group IV metal oxides along with catechol compound (and/or catechol compound/co-reactant compound reaction products) and metal oxides of the substrate metal can be deposited on a metal substrate to provide enhanced corrosion resistance of the final painted part.

The inventive conversion coating composition containing Group IV metals and dopamine (or salt thereof) will deposit polydopamine on metal substrates surprisingly faster, within 2 minutes, than the homopolymerization of polydopamine described in the literature, which requires 8 hours. The mixed conversion coating containing metal oxides and polydopamine provides improved corrosion resistance of the painted substrates. These compositions can also result in the precipitation of polydopamine from the working solution, however.

To eliminate the possible precipitation of polydopamine from the working bath, a series of dopamine-containing polymers were synthesized. Preformed dopamine-based polymers eliminate polydopamine precipitation from the conversion coating solution. Preformed dopamine-based polymer (resulting from reaction of dopamine and functionalized co-reactant compound) also deposits onto metal substrates from the composition in about 2 minutes. It was found that low levels of dopamine monomer in the preformed reaction product are surprisingly effective at improving corrosion resistance of coated metal substrates. Generally, approximately 10% by weight dopamine based on the total weight of the dopamine and amine (functionalized co-reactant compound) in the reaction mixture was sufficient.

Preferably the conversion coating composition prior to application to the metal substrate according to the present invention has the parameters given below in Table 1, realizing that in some embodiments the catechol compound is used alone and in others the reaction products of a catechol compound and a functionalized co-reactant compound such as an amine are utilized. In the present examples, the base conversion coating utilized was Bonderite® M-NT 1820; however, any other conversion coating composition that is an aqueous, acidic conversion coating composition containing a Group IV metal, at a level of 50 to 750 ppm for example, is sufficient to provide the base coating. The pH of the conversion coating composition as used is preferably 5.0 or less as noted below. Other important or preferred components of the base conversion coating composition are: a positive amount of copper at 50 ppm or less; a positive amount of free fluoride at 100 ppm or less and nitrate at 3500 ppm or greater. The Group IV metal can be Zr, Ti, Hf or mixtures thereof, preferably Zr and/or Ti. In certain embodiments, the conversion coating composition may comprise zinc, in particular dissolved zinc. In still other embodiments, the conversion coating composition may additionally comprise one or more of the Si-based substances known in the conversion coating art, such as silanes, $SiO_2$, silicates and the like.

The conversion coating compositions of the present invention may, for example, comprise at least 5, 10, 15, 20, 25, 30, 35, 40, 45, 50, 55 or 60 ppm of catechol compound/functionalized co-reactant compound reaction product but independently not more than 10,000, 9000, 8000, 7000, 6000, 5000, 4000, 3000, 2000, 1500, 1000, 500 or 250 ppm of catechol compound/functionalized co-reactant compound reaction product.

The conversion coating compositions of the present invention may, for example, comprise at least 5, 10, 15, 20 or 25 ppm of catechol compound but independently not more than 200, 150, 100, 75 or 50 ppm of catechol compound.

The conversion coating compositions of the present invention may, for example, comprise at least 50, 60, 70, 80, 90 or 100 ppm of Group IV metal but independently not more than 750, 600, 500, 400, 300 or 200 ppm of Group IV metal.

The conversion coating compositions of the present invention may, for example, comprise at least 1, 2, 3, 4, 5 or 6 ppm of Cu but independently not more than 50, 40, 30, 25, 20 or 15 ppm of Cu.

The pH of the conversion coating compositions of the present invention may, for example, be at least 3.6, 3.7 or 3.8 but independently not more than 4.6, 4.5, 4.4, 4.3 or 4.2.

The conversion coating compositions of the present invention may, for example, comprise at least 10, 11, 12, 13, 14 or 15 ppm of free fluoride but independently not more than 100, 90, 80, 70, 60, 50 or 40 ppm of free fluoride.

The conversion coating compositions of the present invention may, for example, comprise at least 3000 or 3500 ppm of nitrate but independently not more than 15,000, 14,000, 13,000, 12,000, 11,000, 10,000, 9000 or 8000 ppm of nitrate.

After contacting a metal substrate surface with a conversion coating composition in accordance with the present invention, the conversion-coated metal substrate may optionally be rinsed, for example with water and/or with a post-rinse solution or dispersion (sometimes referred to in the art as a "sealer") which further enhances the corrosion resistance of the conversion-coated metal substrate surface.

TABLE 1

| Parameter/component | Preferred range | More preferred range |
| --- | --- | --- |
| Catechol compound-amine reaction product weight % in a concentrate product prior to preparation of a conversion coating composition (weight percent based on combined catechol compound-amine weights) | 0.25 to 90 wt % | 1 to 75 wt % |
| Concentration of catechol compound-amine reaction product in the actual conversion coating composition | 5 to 10,000 ppm | 5 to 500 ppm |
| Concentration of catechol compound wt. % in concentrate product prior to preparation of a conversion coating composition | 0.1-30.0 wt % | 0.2-10 wt % |
| Concentration of catechol compound in the actual conversion coating composition | 5-200 ppm | 25-50 ppm |
| Group IV metal in conversion coating composition | 50 to 750 ppm | 100 to 200 ppm |
| Cu in conversion coating composition | 5 to 50 ppm | 5 to 15 ppm |
| pH of conversion coating composition | 3.6 to 4.6 | 3.8 to 4.2 |
| Free fluoride in conversion coating composition | 10 to 100 ppm | 15 to 40 ppm |
| Nitrate in conversion coating composition | Greater than 3500 ppm | 4000 to 8000 ppm |

Application of Additional Coatings

Following conversion coating and, optionally, one or more post-rinsing (or "sealing") steps, the metal substrate may be subjected to one or more further processing steps, including in particular the application of a paint or other decorative and/or protective coating. In such applications, the conversion coating may function as a primer or anti-corrosion layer. Any such coating known in the art may be employed, including for example, electrophoretic coatings (E-coatings), solvent-borne paints, aqueous-borne paints, powder coating and the like.

Accordingly, the present invention may be practiced in accordance with the following exemplary multi-step process:
1) optionally, cleaning of a metal substrate surface;
2) optionally, rinsing of the cleaned metal substrate surface;
3) conversion coating of the cleaned and rinsed metal substrate surface;

4) optionally, rinsing of the conversion-coated metal substrate surface with water and/or sealing of the conversion-coated metal substrate surface with a post-rinse solution or dispersion;
7) electrophoretic coating of the optionally rinsed and/or sealed conversion-coated metal substrate surface;
8) rinsing of the electrophoretic-coated metal substrate surface with water; and
9) baking of the rinsed electrophoretic-coated metal substrate.

Prior to a conversion coating step utilizing a conversion coating composition in accordance with the present invention, a metal substrate surface may be cleaned using any method known in the art for removing contaminants from the surface of a metal substrate, such as spraying with an alkaline cleaner. The metal substrate surface may also be rinsed prior to conversion coating, either with water alone or with a pre-rinse solution comprising one or more substances capable of further improving the corrosion resistance of the conversion coating subsequently formed on the metal substrate surface. For example, the metal substrate surface may be contacted with a pre-rinse solution comprised of water and one or more reaction products of at least one catechol compound and at least one co-reactant compound so as to deposit a catechol-based rust preventative treatment thereon, as further described in U.S. parent application Ser. No. 16/437,072, filed simultaneously herewith (the disclosure of which is incorporated herein by reference in its entirety for all purposes).

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of a composition, article or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

In the examples given below the following general protocol was followed. The test panels were cleaned by application of Bonderite® C-AK T51, 2% v/v solution at 49° C., Free Alkalinity (FA) of 5.0, 90 second spray at 10 psi. The panels were then rinsed with city water at 38° C. for 60 seconds at 10 psi. Then the panels were rinsed with deionized water at 24° C. for 60 seconds at 10 psi. Then the selected conversion coating was applied to the panels at 32° C. for a 120 second immersion. The panels were rinsed in deionized water for 60 seconds at 24° C. and a pressure of 10 psi. The panels were then E-coated with BASF Catho-Guard® 800 at 35° C., 134 second immersion at 230 V. The panels were then rinsed in deionized water at 24° C. and 10 psi for 60 seconds. Finally, the panels were cured by baking in a 182° C. oven for 35 minutes. The panels tested were the following and their abbreviations are noted: ACT cold rolled steel (CRS); electrogalvanized steel (EG); hot dipped galvanized steel (HDG); and Aluminum 6HS1T4 (Al6HS1T4). The control conversion coating was Bonderite® M-NT 1820 prepared as outlined in its Technical Product Bulletin with the parameters maintained at: Zr 150 ppm; Cu 10 ppm; free F 20 ppm; pH 4.00, temperature 32° C.

Example 1

Dopamine hydrochloride was incorporated into a zirconium oxide pretreatment solution of Bonderite® M-NT 1820 at a dopamine concentration of 63 ppm. The Bonderite® M-NT 1820 solution was prepared as outlined in the Technical Product Bulletin. The dopamine hydrochloride was then added to the Bonderite® M-NT 1820 solution and the parameters were maintained as follows: Zr at 150 ppm, Cu at 10 ppm, Free F at 20 ppm, pH was 4.00, and the temperature was 32° C. (89.6° F.). The solutions of Bonderite® M-NT 1820 with or without dopamine were used to coat ACT CRS panels and these panels were subsequently painted with BASF CathoGuard® 800 as described herein. These panels were tested using a 10 day hot salt water soak in a 5 wt % NaCl solution and a temperature of 55° C. (131° F.). The resulting creeps from scribe U/2 in millimeters (mm) based on three replicates were as follows: control Bonderite® M-NT 1820 was 4.3 mm; Bonderite® M-NT 1820 plus 63 ppm dopamine was 0.8 mm. This shows that the inclusion of a very small level of dopamine, 63 ppm, had a dramatic effect on the corrosion protection afforded by the conversion coating. The control conversion coating was much more effective, over 5 fold more effective, when it included 63 ppm of dopamine. The same solutions, Bonderite® M-NT 1820 control (no dopamine; also referred to herein as "Bonderite® control") and Bonderite® M-NT 1820 plus 63 ppm of dopamine (also referred to herein as "Bonderite® plus 63 ppm of dopamine), were used to coat CRS, EG, HDG, & Al6HS1T4 panels prior to application of the BASF CathoGuard® 800 as described and then the paint adhesion of the panels was tested using the tests GMW14829/14704. The results in terms of % paint remaining based on duplicates were as shown below in Table 2. The results show that both the Bonderite® control and the Bonderite® plus 63 ppm of dopamine were effective at adhering the paint to the surfaces even after water soaking.

TABLE 2

| Treatment Solution and panel metal | Initial value | Post 24 hour water soak | Post 48 hour water soak |
| --- | --- | --- | --- |
| Bonderite ® control CRS | 100 | 100 | 98-100 |
| Bonderite ® + Dopamine CRS | 100 | 100 | 100 |
| Bonderite ® control EG | 100 | 100 | 100 |
| Bonderite ® + Dopamine EG | 100 | 100 | 100 |
| Bonderite ® control HDG | 100 | 100 | 100 |
| Bonderite ® + Dopamine HDG | 100 | 99-100 | 99-100 |
| Bonderite ® control A16H51T4 | 100 | 100 | 100 |
| Bonderite ® + Dopamine A16HS1T4 | 100 | 100 | 100 |

The corrosion resistance of these treated panels was evaluated using the cyclic corrosion test GMW14872, Exposure C for 26 cycles. The results in terms of corrosion creep in mm based on three replicates are shown below in Table 3. Again, the results show that a low level, 63 ppm, of dopamine was very effective at enhancing the corrosion protection provided by the Bonderite® control solution. In all cases both the maximal creep and average creep were significantly reduced. The aluminum panels showed no creep after either treatment.

TABLE 3

| Treatment Solution and panel metal | Maximum | Average |
|---|---|---|
| Bonderite ® control CRS | 5.4 | 3.7 |
| Bonderite ® + Dopamine CRS | 4.0 | 2.7 |
| Bonderite ® control EG | 5.6 | 4.2 |
| Bonderite ® + Dopamine EG | 4.5 | 2.8 |
| Bonderite ® control HDG | 6.2 | 4.3 |
| Bonderite ® + Dopamine HDG | 5.2 | 2.7 |
| Bonderite ® control Al6HS1T4 | 0 | 0 |
| Bonderite ® + Dopamine Al6HS1T4 | 0 | 0 |

Example 2

In Example 2, a reaction product of dopamine and a polyamine (polyethyleneimine) was prepared to test its effect on the corrosion resistance provided by Bonderite® M-NT 1820. To prepare the dopamine/polyamine product, 1.8 grams, 0.00949 moles, of dopamine hydrochloride (Sigma Aldrich) was added to a glass beaker followed by the addition of 50.0 grams of deionized water. The dopamine solution was then vigorously mixed with a magnetic stirrer bar maintaining a vortex for approximately 30 minutes at room temperature in air. To a second glass beaker, 15.0 grams, 0.01875 moles, of a polyamine, polyethyleneimine Lupasol® FG from BASF, was added followed by the addition of 350.0 grams of deionized water. Lupasol® FG is a waterfree polyethyleneimine having a water content of 1% by DIN 53715, K. Fisher and an average molecular weight of 800 by GPC measurement. It is a multifunctional cationic polyethyleneimine with a branched structure. It has an ISO 2555 Brookfield viscosity of 5,000 mPa·s. According to it literature it has a ratio of primary/secondary/tertiary amine of 1/0.9/0.5 by BASF method $^{13}$C NMR. The polyethyleneimine solution was subsequently vigorously mixed with a magnetic stirrer bar maintaining a vortex for approximately 30 minutes at room temperature in air. Room temperature is defined as approximately the range of 16-25° C. (60.8 to 77° F.) for all the examples in this specification. The dopamine hydrochloride solution was then added to the polyethyleneimine solution over a period of approximately 30 seconds while maintaining agitation of the combined polyethyleneimine and dopamine hydrochloride solution with magnetic stirring. A quantity of 5.0 grams of deionized water was used to rinse the dopamine hydrochloride solution beaker into the combined polyethyleneimine and dopamine hydrochloride solution. Vigorous mixing of the combined solutions was continued for approximately 6.0 hours at room temperature in air. The mixture becomes light yellow upon the addition of the dopamine hydrochloride solution and progresses to a dark brown/black during the approximately 6 hour reaction time. The molar ratio of dopamine to polyamine in the final reaction mixture was 1:1.98. The product was transferred to a glass bottle for storage and subsequent evaluation. This product was designated as NB3604-39. The dopamine product, NB3604-39, was incorporated into a zirconium oxide pre-treatment solution of Bonderite® M-NT 1820 at a concentration of 63 ppm. The Bonderite® M-NT 1820 solution was prepared as outlined in the Technical Product Bulletin. The dopamine product, NB3604-39, was then added to the Bonderite® M-NT 1820 solution and the parameters were maintained as follows: Zr at 150 ppm, Cu at 10 ppm, Free F at 20 ppm, pH at 4.00, and temperature at 32° C. (89.6° F.). This solution was used to coat ACT CRS panels and these panels were subsequently painted with BASF CathoGuard 800 as describe. These panels were tested using a 10 day hot salt water soak at 5 wt % NaCl and a temperature of 55° C. (131° F.). The resulting average creeps from scribe, U/2, based on three replicates were 4.3 mm for the control Bonderite® and only 0.7 mm for the Bonderite® plus 63 ppm of the dopamine polyethyleneimine reaction product. Inclusion of only 63 ppm of the dopamine polyethyleneimine reaction product resulted in an improvement of over 6 fold in the corrosion protection afforded by the Bonderite® control conversion coating.

These same treatment solutions were then used to coat Al6HS1T4, aluminium panels, which were tested for corrosion resistance using GM9682P, 4 weeks. The filiform corrosion results in mm based on three replicates were as follows: control Bonderite® showed a maximum of 7.6 mm and an average of 3.5 mm; the Bonderite® plus 63 ppm of the reaction product of dopamine and polyethyleneimine showed a maximum of 2.9 mm and an average of 1.4 mm. These results show an improvement of over 2.5 fold in terms of maximal creep and average creep by including 63 ppm of the dopamine and polyethyleneimine product, 3604-39, in the conversion coating.

The same treatment solutions were used to coat CRS, EG, HDG, & Al6HS1T4 panels. The paint adhesion of these panels was evaluated using the GMW14829/14704 tests. The results in terms of % paint adhering based on duplicates are presented below in Table 4. The results show that both the Bonderite® control and the Bonderite® plus 63 ppm of 3604-39, the dopamine and polyethyleneimine reaction product, were effective at adhering the paint to the surfaces even after water soaking.

TABLE 4

| Treatment Solution and panel metal | Initial value | Post 24 hour water soak | Post 48 hour water soak |
|---|---|---|---|
| Bonderite ® control CRS | 100 | 100 | 98-100 |
| Bonderite ® + 63 ppm 3604-39 CRS | 100 | 100 | 99-100 |
| Bonderite ® control EG | 100 | 100 | 100 |
| Bonderite ® + 63 ppm 3604-39 EG | 100 | 100 | 100 |
| Bonderite ® control HDG | 100 | 100 | 100 |
| Bonderite ® + 63 ppm 3604-39 HDG | 100 | 98-99 | 98-99 |
| Bonderite ® control A16HS1T4 | 100 | 100 | 100 |
| Bonderite ® + 63 ppm 3604-39 A16HS1T4 | 100 | 100 | 100 |

The corrosion resistance of these treated panels was evaluated using the cyclic corrosion test GMW14872, Exposure C for 26 cycles. The results in terms of corrosion creep in mm based on three replicates are shown below in Table 5. Again, the results show that a low level, 63 ppm, of 3604-39, the dopamine and polyethyleneimine product, was very effective at enhancing the corrosion protection provided by the Bonderite® control solution. In all cases both the maximal creep and average creep were significantly reduced. The reduction in creep was very similar to that seen using addition of 63 ppm of dopamine alone to the Bonderite® M-NT 1820. The aluminum panels showed no creep after either treatment.

TABLE 5

| Treatment Solution and panel metal | Maximum | Average |
|---|---|---|
| Bonderite ® control CRS | 5.4 | 3.7 |
| Bonderite ® + 63 ppm 3604-39 CRS | 3.9 | 3.3 |
| Bonderite ® control EG | 5.6 | 4.2 |
| Bonderite ® + 63 ppm 3604-39 EG | 4.7 | 2.9 |
| Bonderite ® control HDG | 6.2 | 4.3 |
| Bonderite ® + 63 ppm 3604-39 HDG | 5.4 | 2.9 |
| Bonderite ® control A16HS1T4 | 0 | 0 |
| Bonderite ® + 63 ppm 3604-39 A16HS1T4 | 0 | 0 |

Example 3

In Example 3, another reaction product of dopamine and a functionalized co-reactant compound was prepared to evaluate its effect on the properties of a conversion coating. In this example the functionalized co-reactant compound selected was Sipomer® WAM II, methacrylamidoethyl ethylene urea (MAEEU), CAS Number 3089-19-8 from Solvay, molecular weight 197 grams. To prepare a reaction product of dopamine and Sipomer® WAM II, 0.30 grams, 0.00158 moles, of dopamine hydrochloride (Sigma Aldrich) was added to a glass beaker followed by the addition of 12.7 grams of deionized water. The dopamine solution was then vigorously mixed with a magnetic stirrer bar maintaining a vortex for approximately 10 minutes at room temperature in air. To a second glass beaker, 3.0 grams, 0.01523 moles, of MAEEU was added followed by the addition of 50.0 grams of deionized water. The MAEEU solution was subsequently vigorously mixed with a magnetic stirrer bar maintaining a vortex for approximately 10 minutes at room temperature in air. The dopamine hydrochloride solution was then added to the MAEEU solution over a period of approximately 30 seconds while maintaining agitation of the combined MAEEU and dopamine hydrochloride solution with magnetic stirring. A quantity of 3.0 grams of deionized water was used to rinse the dopamine hydrochloride solution beaker into the combined MAEEU and dopamine hydrochloride solution. The molar ratio of dopamine to MAEEU in the final reaction mixture was 1:9.64. Vigorous mixing of the combined solutions was continued for approximately 5.5 hours at room temperature in air during which time there was no obvious change in color of the mixture. The product was transferred to a glass bottle for storage and subsequent evaluation. This product is designated as NB3604-60. The structure of MAEEU (which contains a methacrylamide functional group) is shown below as formula I:

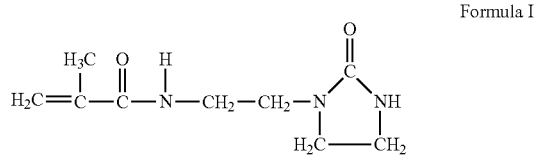

Formula I

The dopamine and MAEEU product, NB3604-60, was incorporated into Bonderite® M-NT 1820 at a concentration of 63 ppm using the same process and operating conditions as outlined in Example 2. This solution was used to coat metal panels and these panels were subsequently painted with BASF CathoGuard® 800. These panels were tested using a 10 day hot salt water soak of 5 wt % NaCl at 55° C. The resulting creeps from scribe, U/s, in mm based on three replicates were as follows: control Bonderite® M-NT 1820 was 4.5 mm and Bonderite® plus 63 ppm of 3604-60 was 2.5 mm. Again, the addition of a reaction product of dopamine and a functionalized co-reactant compound produced a dramatic enhancement of the corrosion protection afforded by Bonderite® M-NT 1820. The enhancement was almost 2 fold.

The same treatment solutions were used to coat CRS & Al6HS1T4 panels followed by coating with BASF CathoGuard® 800. Then the paint adhesion of these panels was evaluated using GMW14829/14704. The results are presented below in Table 6 and again show that both solutions were able to retain paint on the panels, although the control Bonderite® was not as effective on Al6HS1T4 panels.

TABLE 6

| Solution and panel | Initial value | Post 24 hour water soak | Post 48 hour water soak |
|---|---|---|---|
| Bonderite ® control CRS | 100 | 100 | 100 |
| Bonderite ® + 63 ppm 3604-60 CRS | 100 | 100 | 100 |
| Bonderite ® control A16HS1T4 | 100 | 95-100 | 95 |
| Bonderite ® + 63 ppm 3604-60 A16HS1T4 | 100 | 100 | 100 |

The corrosion resistance of these treated panels was evaluated using the cyclic corrosion test GMW14872, Exposure C for 26 cycles. The results in terms of corrosion creep in mm based on three replicates are shown below in Table 7. Again, the results show that a low level, 63 ppm, of 3604-60, the dopamine and MAEEU product, was very effective at enhancing the corrosion protection provided by the Bonderite® control solution. In the case of CRS panels both the maximal creep and average creep were significantly reduced. The reduction in creep was very similar to that seen using addition of 63 ppm of dopamine alone to the Bonderite® M-NT 1820. The aluminum panels showed no creep after either treatment.

TABLE 7

| Treatment Solution and panel metal | Maximum | Average |
|---|---|---|
| Bonderite ® control CRS | 7.2 | 5.0 |
| Bonderite ® + 63 ppm 3604-60 CRS | 5.3 | 3.1 |
| Bonderite ® control A16HS1T4 | 0 | 0 |
| Bonderite ® + 63 ppm 3604-60 A16HS1T4 | 0 | 0 |

Example 4

To prepare another reaction product of dopamine and a polyamine, 0.73 grams, 0.00384 moles, of dopamine hydrochloride (Sigma Aldrich) was added to a glass beaker followed by the addition of 18.4 grams of deionized water. The dopamine solution was then vigorously mixed with a magnetic stirrer bar maintaining a vortex for approximately 40 minutes at room temperature in air. To a second glass beaker, 7.5 grams, 0.00030 moles, of a polyamine, polyethyleneimine Lupasol® WF, another polyethyleneimine from BASF, was added followed by the addition of 181.6 grams of deionized water. The Lupasol® WG is a waterfree polyethyleneimine having a water content of 1% by DIN 53715, K. Fisher and an average molecular weight of 25,000 by GPC measurement. It is a multifunctional cationic polyethyleneimine with a branched structure. It has an ISO 2555 Brookfield viscosity of greater than 200,000 mPa·s. According to the supplier's literature, it has a ratio of primary/secondary/tertiary amine of 1/1.1/0.7 by BASF method $^{13}$C NMR. The polyamine solution was subsequently vigorously mixed with a magnetic stirrer bar maintaining a vortex for approximately 40 minutes at room temperature in air. The dopamine hydrochloride solution was then added to the polyamine solution over a period of approximately 30-60 seconds while maintaining agitation of the combined polyamine and dopamine hydrochloride solution with magnetic stirring. A quantity of 5.2 grams of deionized water was used to rinse the dopamine hydrochloride solution beaker into the combined polyamine and dopamine hydrochloride solution. Vigorous mixing of the combined solutions was continued for approximately 7.0 hours at room temperature in air. The molar ratio of dopamine to polyamine in the final reaction mixture was 1:0.078. The mixture becomes light yellow upon the addition of the dopamine hydrochloride solution and progresses to dark brown/black during the approximately 7 hour reaction time. The product was transferred to a glass bottle for storage and subsequent evaluation. This product is designated as NB3604-87A.

Example 5

In Example 5, a reaction product of another catechol, 3,4-dihydroxy-L-phenylalanine, and a polyamine, polyethyleneimine, was created. First, 0.24 grams, 0.00122 moles, of 3,4-dihydroxy-L-phenylalanine (Sigma Aldrich) was added to a glass beaker followed by the addition of 25.3 grams of deionized water. The phenylalanine solution was then vigorously mixed with a magnetic stirrer bar maintaining a vortex for approximately 25 minutes at room temperature in air. To a second glass beaker 2.2 grams, 0.00275 moles, of the polyethyleneimine Lupasol® FG (BASF) was added followed by the addition of 52.3 grams of deionized water. The polyamine solution was subsequently vigorously mixed with a magnetic stirrer bar maintaining a vortex for approximately 25 minutes at room temperature in air. The phenylalanine solution was then added to the polyamine solution over a period of approximately 15 seconds while maintaining agitation of the combined polyamine and phenylalanine solution with magnetic stirring. A quantity of 10.1 grams of deionized water was used to rinse the phenylalanine solution beaker into the combined polymine and phenylalanine solution. There was a small amount of undissolved phenylalanine which was transferred via this rinse process and subsequently dissolved. Vigorous mixing of the combined solutions was continued for approximately 6.0 hours at room temperature in air. The mixture becomes light yellow upon the addition of the 3,4-dihydroxy-L-phenylalanine solution and progresses to dark brown/black during the approximately 6 hour reaction time. The molar ratio of 3,4 dihydroxy L phenylalanine to polyamine in the final reaction mixture was 1:2.25. The product was transferred to a glass bottle for storage and subsequent evaluation. The product is designated as NB3604-90.

Example 6

ACT CRS panels were conversion-coated in accordance with the following process:
Application Process:
1). Clean: Bonderite® C-AK T51 (2% v/v, 49° C., FA 5.0, 90 second spray, 10 psi).
2). Rinse: City water (38° C., 60 second spray, 10 psi).
3). Rinse: Deionized water (24° C., 60 second spray, 10 psi).
4). Conversion Coating:
    Control: Bonderite® M-NT 1820 prepared as outlined in its Technical Product Bulletin with the parameters maintained at: Zr 150 ppm; Cu 10 ppm; free F 20 ppm; pH 4.00, temperature 32° C. (32° C., 120 second immersion).
    Invention: Control+63 ppm of the reaction product of dopamine hydrochloride and polyethyleneimine, prepared in accordance with the following procedure: 1.8 grams of dopamine hydrochloride and 15.0 grams of Lupasol® FG (BASF polyethyleneimine, molecular weight ~800) were dissolved in 405 grams of deionized water and allowed to react with vigorous agitation for 6 hours at ambient temperature (20-25° C.).
5). Rinse: Deionized water (24° C., 60 second spray, 10 psi).
6). Dry: Forced air (90 psi)

A comparison of the conversion-coated panels using FTIR analysis showed that the coating formed in accordance with the present invention (i.e., a panels which was conversion-coated using a conversion coating composition containing a reaction product of a catechol compound and a co-reactant compound comprising one or more functional groups reactive with the catechol compound) exhibited peaks characteristic of organic substances, in particular organic substances containing aromatic rings (e.g., aromatic rings derived from the catechol compound). The FTIR spectrum of a panel having the control conversion coating deposited on its surface did not exhibit any such peaks. These results provide evidence that the reaction products of the dopamine hydrochloride and the polyethyleneimine become incorporated as part of the conversion coating.

As discussed in the present specification, the inventors have developed an additive for a conversion coating composition and a conversion coating composition having the additive that have enhanced corrosion protective effects. The additive comprises a catechol compound, the reaction products of a catechol compound and a co-reactant compound (such as an amine) comprised of one or more functional groups reactive with the catechol compound, or mixtures thereof. The catechol compound can be a catecholamine (i.e., an amine-functionalized catechol) or a salt thereof, non-limiting examples of which include dopamine and salts thereof; a substituted dopamine or a salt thereof, or another catecholamine such as 3,4-dihydroxy-L-phenylalanine or a salt thereof. The substituted catechol can include functional groups such as a hydroxyl group, a carboxyl group, a thiol group, or mixtures thereof. The amine that is reacted with the catechol or catecholamine can be any of a variety of amines. Non-limiting examples of suitable amines include linear or branched polyamines such as polyethyleneimines having number average molecular weights of up to 2,000,000 or from 800 to 25,000 for example and including within its structure primary, secondary and tertiary amines. Besides amines, the catechol compound may be reacted with other types of functionalized co-reactant compounds such as methacrylamidoethyl ethylene urea (MAEEU) and other compounds functionalized with one or more (meth)acryl, thiol and hydroxyl groups reactive with the catechol compound.

In one embodiment, a process for formation of the reaction products of a catechol compound (e.g., a catecholamine) and a functionalized co-reactant compound (e.g., an amine or (meth)acryl-functionalized compound) is as follows. First, separate aqueous solutions of the catechol compound and the functionalized co-reactant compound are prepared using deionized water and vigorous stirring at a temperature of from 16 to 25° C. The vigorous stirring of each solution is carried out for a period of time from 10 to 40 minutes depending on the concentration of the catechol or catecholamine and the amine in their respective solutions. Then the catechol compound solution is added to the functionalized co-reactant compound solution over a period of time from 15 to 60 seconds and the container of the catechol compound solution is rinsed into the container with the functionalized co-reactant compound solution. The vigorous stirring is continued at a temperature of from 16° C. to 25° C. for a period of time from 5 to 7 hours. The color of the reaction mixture may or may not change as the reaction progresses. The product is then stored in a glass bottle until use. Preferably the molar ratio of catechol compound to reactive functional groups in the functionalized co-reactant compound in the reaction mixture ranges from 1:0.05 to 1:25 or from 1:0.05 to 1:10.

The catechol compound or reaction product of a catechol compound with a functionalized co-reactant compound such as an amine finds use as an additive to conversion coating compositions that are acidic aqueous solutions of Group IV metals, preferably Zr or Ti. The conversion coating compositions preferably have the composition as described in Table 1 above and include one or more Group IV metal, copper, free fluoride, nitrate and have a pH of 5.0 or less. The additive and the conversion coating can be prepared as concentrates as known in the art. In the final conversion coating solution (i.e., the composition as used in a working bath in a conversion coating process) the components preferably are present in the amounts indicated in Table 1. The conversion coating composition can be used to coat a variety of metals including steel, cold rolled steel, electrogalvanized steel, hot dipped galvanized steel, and aluminums. Preferably, the conversion coating composition is applied via an immersion dip coating; however, it can also be applied by spray or roller. An unexpected advantage of the present invention is that the conversion coatings can be formed on metal substrate surfaces with incorporated catechol compound or reaction products of catechol compounds and functionalized co-reactant compounds (e.g., amines) with a short dip exposure of less than 5 minutes, more preferably from 1 to 3 minutes. This is much a faster processing time as compared to processes described in various publications where application of catechol-containing coatings to metals required alkaline pH of 8 or more, elevated temperatures, and long application times of 8 hours or more.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An aqueous conversion coating composition comprising: at least one Group IV metal; at least one additive selected from the group consisting of at least one reaction product of a catecholamine or salt thereof and a polyamine having a number average molecular weight ranging from 500 to 2,000,000 and said polyamine is linear or branched, at least one reaction product of a catecholamine or salt thereof and methacrylamidoethyl ethylene urea and combinations thereof; and, optionally, one or more additional components selected from the group consisting of copper, free fluoride, zinc, nitrate and Si-based substances, said aqueous conversion coating composition comprising no more than 0.5 ppm boron and having a pH of 3.6 to 5.0.

2. An aqueous conversion coating composition as recited in claim 1 wherein said at least one Group IV metal is present in an amount of from 5 to 750 ppm; if present, copper is present in an amount of from 5 to 50 ppm; if present, free fluoride is present in an amount of from 10 to 100 ppm; if present, nitrate is present in an amount of 3500 ppm or greater; and said additive is present in an amount of from 5 to 10,000 ppm.

3. An aqueous conversion coating composition as recited in claim 1, wherein said catecholamine is selected from the group consisting of dopamine; 3,4 dihydroxy-L-phenylalanine; and salts and mixtures thereof.

4. An aqueous conversion coating composition as recited in claim 1, wherein the molar ratio of the catecholamine or salt thereof to functional groups reactive with the catecholamine or salt thereof which are present in the polyamine and/or methacrylamidoethyl ethylene urea ranges from 1:0.05 to 1:25.

5. An aqueous conversion coating composition as recited in claim 1, wherein the at least one additive includes said at least one reaction product of a catecholamine or salt thereof and a polyamine wherein said polyamine is linear or branched and has a number average molecular weight ranging from 500 to 50,000.

6. A method of coating a metal substrate with a conversion coating composition comprising steps of:
    a) providing a metal substrate, optionally having a catechol-based rust preventative treatment thereon;
    b) providing an aqueous acidic conversion composition according to claim 1; and
    c) contacting the metal substrate with the conversion coating composition at a temperature of not more than 60° C. for a period of time of 20 minutes or less.

7. The method as recited in claim 6 wherein said catechol compound is selected from the group consisting of dopamine; 3,4 dihydroxy-L-phenylalanine; and salts and mixtures thereof.

8. The aqueous conversion coating composition as recited in claim 2, wherein said at least one additive comprises the at least one reaction products of a catecholamine or salt thereof and co-reactant compound selected from the group consisting of polyethyleneimines, methacrylamidoethyl ethylene urea, and mixtures thereof.

9. The aqueous conversion coating composition as recited in claim 8, wherein said co-reactant compound is branched polyethyleneimine having a number average molecular weight of from 500 to 200,000 or more.

10. The method as recited in claim 6, wherein the aqueous acidic conversion coating composition further comprises at least one of an Si-based substance, zinc, copper, free fluoride or nitrate.

11. The aqueous conversion coating composition as recited in claim 1, wherein said Group IV metal comprises zirconium, titanium, or mixtures thereof.

* * * * *